United States Patent Office 3,518,343
Patented June 30, 1970

3,518,343
EFFERVESCENT TABLET AND PROCESS
FOR MAKING SAME
Thomas Laurence Welsh, Donald Leroy Peterson, Blasey Thomas Palermo, and George Carr Hoss, Elkhart, Ind., assignors to Miles Laboratories, Inc., Elkhart, Ind., a corporation of Indiana
No Drawing. Filed Oct. 2, 1967, Ser. No. 671,948
Int. Cl. A61j 3/10
U.S. Cl. 424—44                                                              8 Claims

ABSTRACT OF THE DISCLOSURE

An effervescent tablet is produced by preparing a powdered tabletable composition comprising an effervescent couple, an antimicrobial substance, a tableting lubricant, and preferably, a flavoring, sweetening and/or coloring agent, mixing the same to achieve uniformity, and compressing into coherent tablet form. The lubricant can be fumaric acid or particles of a liquid lubricant coated with an oil-insoluble film-forming substance. Upon dissolution, a solution having antimicrobial properties is produced. The solution is useful for cleaning solid surfaces, particularly, the teeth and periodontal gum areas of the oral cavity.

BACKGROUND OF THE INVENTION

This invention relates to an effervescent tablet which when dissolved in water produces a cleaning solution having antimicrobial properties. The tablet is particularly useful for producing solutions for cleaning solid surfaces, such as the surfaces of the oral cavity.

Effervescent tablets for producing cleaning compositions have been formulated in the past but upon dissolution these have not formed consistently uniform solutions. The manufacture of these tablets has been attended with difficulties arising from the poor tableting properties of the powdered compositions from which they were formed. These difficulties arose mainly from the type of tableting lubricants which heretofore have been available for use. These prior lubricants were usually insoluble in water and, hence, tablets lubricated therewith did not form uniform solutions upon dissolution, but rather formed clouded dispersions with surface scum or two phase mixtures which were of limited usefulness with respect to cleaning employments. Examples of lubricants which form clouded dispersions are talc and magnesium stearate. Lubricants which cause the formation of two phase mixtures are the mineral oils which must be used in relatively high concentrations of 5% and 10% of the tablet weight to provide effective tablet lubrication. Some of the materials used as lubricants do not have sufficient lubricating properties to allow commercially feasible tableting rates.

The inclusion of antimicrobial agents in the prior art effervescent tablets has been mainly unsuccessful due to incompatibility of such agents with the other materials in compressed form. Also, the liquid state of many of such agents has rendered difficult their inclusion in powdered tabletable compositions.

It has now been found that adequate lubrication and antimicrobial properties can be imparted to effervescent tablets by including therein a lubricant of fumaric acid or particles of a liquid lubricant coated with a water-soluble, oil-insoluble film-forming substance, and by including a solid state antimicrobial agent which is water-soluble. Such tablets can be used for cleaning solid surfaces of all types and can be produced at commercially feasible production rates.

It is therefore an object of the present invention to provide a commercially acceptable process for manufacturing a water-soluble tablet containing an effervescent couple, an antimicrobial agent, and a solid state lubricant.

Another object is to provide a water-soluble tablet containing the above-mentioned components which dissolves in water to form a uniform solution.

SUMMARY OF THE INVENTION

Water-soluble tablets are made by preparing a powdered mixture of an effervescent couple, a tableting lubricant, an antimicrobial substance, and, preferably, a flavoring and/or coloring material; mixing said ingredients and then compressing the same into coherent tablet form. The resulting tablet can be used to form a cleaning solution upon being dissolved in water. The tablet can be formulated to have special applicability for cleaning the oral cavity, i.e., it can produce a mouthwash solution upon dissolution in water.

The effervescent couple of the powdered tablet composition consists of at least one each of a solid acid and a solid basic material which when dissolved in water react with one another to produce carbon dioxide, $CO_2$, which causes effervescence. The acid can be an organic acid such as malic, fumaric, tartaric, itaconic, maleic, citric or mesaconic acid, or a corresponding anhydride such as itaconic anhydride and citraconic anhydride or it can be an inorganic acid such as sulfamic acid or a phosphonic acid derivative such as disclosed in U.S. Pat. No. 3,325,357. The basic material can be any of the metal carbonate salts such as alkali or alkaline earth carbonates and bicarbonates. Examples of such materials are: lithium, sodium, potassium, magnesium, and calcium carbonates or bicarbonates. The combination of certain of these acids and bases result in much more rapid effervescence when placed in water than do other members of the above groups. In particular, citric acid and sodium bicarbonate constitute a preferred couple due to their rapid reaction and consequent effervescence.

As stated above, the tableting lubricant can be either fumaric acid or particles of a liquid lubricant coated with a water-soluble film-forming substance. The lubricant can also be a mixture of these two materials. When fumaric acid is used an amount of about at least 5% of the acid based on the total weight of the lubricant and the tabletable composition is employed. If desired, the fumaric acid may be used in larger amounts up to about 14% or even approaching the total tablet weight, since fumaric acid is itself cohesive when compressed. The fumaric acid can be used in its naturally occurring form which is small prisms or it can be comminuted to any desired fineness. Mesh sizes of 40 and finer (U.S. Standard) are particularly preferred for use with most powdered compositions. Since fumaric acid is a polycarboxylic acid, it provides the additional effect of taking part in the effervescent action. When this occurs it is neutralized to a readily soluble metal salt providing a sufficient amount of a metal carbonate is employed. Such neutralization is preferred for the more rapidly effervescing tablets in order to increase the solubility of the fumaric acid.

The coated particulate lubricant consists of particles of a lubricating oil coated with an oil-insoluble, water-soluble film-forming substance. The amount of the coated lubricant can be varied to suit the desired tableting speed. It is usually sufficient to use at least about 0.5% of the lubricant based on the total tablet weight including the lubricant. Preferably, less than about 5% of the coated lubricant is employed; however larger amounts approaching about 50% of the total tablet weight can be used if desired.

The lubricating oil in the coated particles can be any of the viscous vegetable, animal, mineral, or synthetic oils, and preferably those having viscosities in about the 100 to 200 centipoise (cps.) range. Examples of such vegetable oils are those obtained from the following sources: corn, cotton seeds, coconuts, peanuts, olives, soybeans, sun-flower seeds, palm kernels, flaxseeds, safflower seeds, etc. Examples of such animal oils are: cod liver oil, whale oil, seal oil and neat's-foot oil. The mineral oils usable are those which are highly purified, such as refined petroleum distillates. The synthetic oils which are most useful are the polyethylene glycols of 250 to 2000 molecular weight. Most of these liquid lubricants can be hydrogenated as desired to provide greater saturation of the fatty acid moieties thereof.

A particularly preferred lubricant composition can be formed by including in the tablet about 10% to 40% by weight of a siloxane polymer based on the total weight of the lubricating oil. The siloxane polymer is preferably a polymer of polydimethyl siloxane. This siloxane polymer can be added directly to the powdered composition, or it can be, and is preferably, incorporated with the lubricating oil of the coated particles. The siloxane polymer lends a free flowing characteristic to the coated lubricant particles when incorporated in the lubricating oil, and it also aids punch face and die wall lubrication during tablet compression. An additional effect is that complete dissolution of the tablets is attained in a shorter time by including the siloxane polymer. For instance, dissolution of a tablet occurred in about 1 minute in a closed vessel with the siloxane polymer and in about 3 minutes without this component.

The improved flow and lubrication characteristics attained by inclusion of the siloxane polymer are caused partly by reason of the fact that a small amount of the lubricating oil is present on or near the surface formed by the film-forming substance. Thus the coated particles have a slight tendency toward cohesiveness, but this tendency is easily overcome by mixing the coated particles with the other powdered materials. The coated particles are for this reason dry mixable in physical characteristics, rather than being truly free flowing. The presence of the siloxane polymer in the oil on or near the surfaces of the particles lowers the cohesiveness between particles and promotes flow of the particles. The siloxane polymer also tends to decrease the surface tension of any lubricating oil adhering to the punch and die surfaces of the tableting machine so that the retained oil film on such surfaces is thinner and therefore such surfaces remain cleaner during tableting.

The film forming substance of the coated lubricant particles can be any of a broad range of materials such as those exemplified by: water-soluble gums, modified celluloses, proteinaceous materials, polymeric sea plant derivatives, agar-agar, or synthetic film-forming substances such as polyvinylpyrrolidone. The water-soluble gums can be gum arabic (gum acacia), pectin, gum tragacanth, gum karaya, guar gum, locust bean gum, and starch gum (dextrin) in either natural or modified form such as carboxylated dextrin. The modified celluloses may be ethers or esters such as hydoxypropylmethyl cellulose or carboxymethyl cellulose. Proteinaceous materials which may be employed among others are gelatin, albumin, and casein. Various polymeric sea plant derivatives such as algins, alginates, and carragheenates can also be employed. The synthetic film-forming substances can be either water-soluble or water dispersible. Generally, these substances are water-soluble and polymeric in nature and form resinous layers about the lubricating oil particles upon being dried thereabout. The dextrin or starch gums are preferred for the film-forming substances, since they are insoluble in the various lubricating oils set out above, water-soluble, and they rapidly release bound and patrially bound water during spray drying.

The coated particulate lubricant is manufactured by the steps of (1) preparing an oil-in-water emulsion of the lubricating oil which contains, in the water phase, a water-soluble, oil-insoluble film-forming substance in a proportion of about 1 to 9 weight parts per 1 weight part of the lubricating oil, (2) maintaining the emulsion at about 15° C. or above while continuously agitating the same, (3) spraying the emulsion into a moving air stream having an initial temperature prior to contact with the emulsion of about from 150° C. to 265° C., (4) drying the emulsion to a water content of about 2–10% and, (5) collecting the dried, coated oil particles.

The proportion of about from 2 to 4 weight parts of the film-forming substance per 1 weight part of the lubricating oil is preferred in order to remain well below the 9:1 limit where the oil content becomes insufficient. A final water content of about 3% to about 5% based on the weight of the coated particles, and temperatures in a range of about 15° C. to about 40° C. for step (2) are preferred. Further, it has been found that the higher temperatures, in the range of about 240° C. to about 265° C. are preferred for step (3). The drying process may be carried out by allowing the emulsion to be sprayed into the moving air stream at a low pressure differential from a rotating spray wheel or nozzle. The air stream does not have to be specially dried in order to have low humidity, since the equilibrium humidity at temperatures in the above range are sufficient to provide for the quick removal of excess water from the emulsion.

The process of drying can, preferably, be carried out in standard spray-drying equipment wherein an emulsion outlet is associated with a distribution wheel which spins the emulsion out into the gas space enclosed by the apparatus. In such apparatus the wheel is spun at about 40,000 r.p.m. by an electric motor or application of air pressure to a turbine connected with the wheel. The inlet air ports for the heated air stream are spaced near the wheel and the commingled air and dried particles exit at the bottom of the apparatus. A cyclone separator can be employed to separate the coated particles from the air stream if desired. Most driers have at least a secondary recovery cyclone separator.

While spray drying is the preferred process, other processes such as lyophilization can also be used to dry the emulsion to particulate form.

Generally, the emulsion for the above process is prepared by making a solution of the film-forming substance with as little water as necessary in order to form the solution and then adding thereto the lubricating oil and emulsifying by vigorous agitation. Additional water may be added to the thus formed emulsion in order to obtain desired spray drying characteristics.

With either the fumaric acid lubricant or the coated lubricating oil particles high tableting rates are attainable on power driven tableting equipment. When concentrations of fumaric acid of about from 5 percent to 14 percent based on the total weight of the lubricated composition, or concentrations of the coated particles of about from 1 to 2 percent on the same basis are employed, tableting rates up to about 5,000 tablets per minute on rotary tableting machine containing 49 punch and die sets are attainable. Each punch and die set produces approximately 102 tablets per minute in such machines. On a rotary machine containing 33 punch and die sets tablets may be compressed at a rate of 76 tablets per minute per set for a total production of about 2500 tablets per minute.

The antimicrobial substance of the water soluble tablet of this invention can be any of the wide range of microbiostatic or microbiocidal compounds or substances.

Among the usable antimicrobial substances and antibacterial substances which may be employed are phenol and its homologs and derivatives such as alkyl phenols, halogenated phenols, polyhydric phenols, and the diphenyl and similar aryl derivatives. Also, the synthetic phenolic materials such as chloroxylenol can be employed. Various soaps such as fatty acid soaps or natural oil soaps can be used as can various solid alcohols, particularly chlorinated benzyl alcohols. Other materials which function as antimicrobial substances are syes, surface active compounds, halogenated compounds, heavy metal salts and substances which release gases which are lethal to microbes. Dyes which may be employed as antimicrobial substances are triphenylmethane dyes such as Malachite Green, Brilliant Green and Crystal Violet; acidine dyes, and the various substituted acridine dyes. Surface active compounds having antimicrobial activity which may be employed are generally the quaternary ammonium compounds, such as cetyldimethylbenzylammonium chloride, cetyltrimethylammonium bromide, cetylpyridinium bromide or chloride, tetradecylpyridinium bromide, alkyldimethylbenzylammonium chloride, β - phenoxyethyldimethyldodecylammonium bromide, di (n-octyl) dimethylammonium bromide, p - tert-octylphenoxyethoxyethyldimethyldecylammonium chloride, and N - (acylcolaminoformylmethyl) pyridinium chloride. From this list it can be seen that the four quaternary substituent groups can be any of a wide variety of moieties. The halogen compounds which show antimicrobial activity are numerous and may be materials such as the hypochlorites, the inorganic chloramines, and the organic chlorine-releasing compounds such as sodium p - toluenesulphonchloroamide, p - sulphondichloroaminobenzoic acid and dichloroisocyanuric acid. The heavy metal compounds are generally those of mercury, silver, copper and tin. The salts usable are those such as mercuric chloride, mercurochrome, merthiolate, and phenylmercuric nitrate, silver nitrate, silver citrate, silver lactate, copper naphthenate, copper oleate, and copper pentachlorophenate. The lethal gases most useful are oxygen and chlorine the first of which can be released from a perborate, anhydrous perborate, or monopersulfate salt and the latter of which can be released by combining a chloride salt with a persulfate salt in an acid media.

Of the above antimicrobial compounds the surface active compounds are preferred and of these the FDA approved compounds are particularly preferred. Cetyldimethylbenzylammonium chloride is a preferred compound where a mouthwash tablet is to be formulated.

The coloring and flavoring agents used in the tabletable composition can be any which are compatible with the particular employment intended for the finished tablet. Where the cleaning solution formed by dissolution of the tablet is to be employed to clean inanimate surfaces, a coloring material such as a water soluble dye may be used if desired. Generally any of the FD and C dyes can be used. A flavor is needed only if a mouthwash solution or similar internal application is intended. Various flavors such as spray dried flavor oils, and food grade esters may be employed as flavoring components. If desired, such components can be incorporated into the oil prior to forming the coated particles. Essential oils are particularly suited for such inclusion.

When a tablet is to be used for cleaning the teeth a substance having anticaries activity can be included in the tabletable composition from which the tablet is made in an amount which will allow some anticaries protection to be imparted to the teeth surfaces. Anticaries active substances represented by the following partial list can be employed for this purpose: stannous fluoride, stannous chlorofluoride, sodium monofluorophosphate, sodium fluoride, pyridoxine, pyridoxine·HCl, dipyridoxine fluorophosphate, and mixtures thereof. Particularly preferred substances are stannous fluoride and sodium monofluorophosphate. A wide range of amounts of such anticaries substances can be included in the tablet of this invention. About from 1 to 100 mg. of such substances can be included in a 4 gram tablet with a preferred amount of about 8 mg.

Tablets including such anticaries substances when dissolved in water produce solutions which upon repeated use as mouthwashes provide anticaries protection for the teeth surfaces.

The above-mentioned coated oil particles lubricant with which these various tabletable compositions are lubricated during compression can have particle sizes of about from 1 to 200 microns. Preferred lubricant particles which are produced by the above-described spray drying method have particle sizes which range from about 1 micron to about 50 microns with a mean diameter of about 15.6 microns.

DESCRIPTION OF THE PREFERRED EMBODIMENT

The prefered effervescent tablet of the present invention forms a solution useful as a mouthwash upon dissolution in water. The tablet is produced by forming a tabletable powdered mixture of citric acid, sodium bicarbonate, spray dried coated oil particles lubricant, cetyldimethylbenzylammonium chloride, flavoring and sweetening agents. The tabletable mixture contains 1.4 percent or less of the coated oil particle lubricant based on the total mixture weight. The amount of the cetyldimethylbenzylammonium chloride surface active compound, which functions as an antimicrobial substance, is less than 1 percent. The flavoring and sweetening agents are added as desired but are generally about 1 percent of the total composition weight. A tabletable composition of this general formulation can be high speed tableted on power driven rotary tableting machines for commercial production.

The coated oil particle lubricant preferred for this formulation consists of refined vegetable oil particles coated with a starch gum (dextrin) in a ratio of 2 weight parts of the starch gum to 1 part of the refined oil. The coated particles are formed by spray drying as above set out and contain from 10% to 40% by weight of a siloxane polymer dispersed in the vegetable oil.

Upon dropping a 4 gram 1 inch diameter tablet into approximately 135 cc. of 110° F. water a pleasant tasting and effective mouthwash solution is formed in approximately one minute.

These and other aspects of the present invention will be apparent to those skilled in the art from the following examples which are intended to be illustrative and not limitative. The concentration of components are stated as weight percent of the weight of the lubricated material as tableted.

EXAMPLE I

| Table components | Weight, g. | Weight, percent |
| --- | --- | --- |
| (1) Sodium bicarbonate | 6,780 | 52.5 |
| (2) Citric acid (anhydrous) | 5,712 | 44.3 |
| (3) Coated oil particles | 180 | 1.4 |
| (4) Flavoring | 150 | 1.2 |
| (5) Sodium cyclohexylsulfamate | 60 | .5 |
| (6) Sodium saccharin | 6 | .05 |
| (7) Cetyldimethylbenzylammonium chloride | 15 | .12 |
| Totals | 12,903 | 100.07 |

Components 1 and 2 were blended, passed through a screen and dried. The remaining components were blended with this dry mixture. The final mixture was then compressed into tablets on a single punch tableting machine at a commercial rate. The tablets were one inch in diameter and had an average weight of about 4.3 g. They contained 1.4 percent of the coated oil particles lubricant based on the tablet weight.

The tablets when dissolved in about 135 ml. of tap water produced a pleasant tasting mouthwash solution.

The coated oil particles were formed by spray drying, as above set out, using a refined vegetable oil which had good heat and air stability and which was resistant to microbial attack. The free fatty acids content was 0.05% maximum, the oxygen stability was 450–500 hours as measured by the Active Oxygen Method (Tentative Method Cd 12–57 revised 1959 published in "Official and Tentative Procedures of the American Oil Chemists Society"; 3rd ed., 1966, Chicago, Ill.), and the Wiley melting point was 22±2° F. The major fatty acid moieties were: palmitic 8 to 10 percent, stearic 2 to 4 percent, oleic 43 to 47 percent, elaidic 39 to 43 percent, and linoleic 1 to 3 percent. A vegetable oil of this description can be obtained from Durkee Famous Foods, Inc., Cleveland, Ohio under the trade name "Durkex 500."

The film-forming substance was used in a 2:1 weight ratio with respect to the lubricating oil and was a starch gum having the following characteristics: viscosity—120 to 140 cps.; particle size—98 percent of the powder passes through a 40 mesh screen (U.S. Standard); and color—light tan. This starch gum was a stable corn dextrin. A dextrin of this description can be obtained from National Starch and Chemical Company, Inc., New York, N.Y. under the trade name "Nadex 772."

The flavoring was a spray dried flavor oil coated with the same dextrin.

EXAMPLE II

| Table ingredients | Weight, g. | Weight, percent |
|---|---|---|
| (1) Sodium bicarbonate | 6,780 | 53.3 |
| (2) Citric acid (anhydrous) | 4,284 | 33.7 |
| (3) Fumaric acid | 1,428 | 11.2 |
| (4) Flavoring | 150 | 1.2 |
| (5) Sodium cyclohexylsulfamate | 60 | .47 |
| (6) Sodium saccharin | 6 | .04 |
| (7) Cetyldimethylbenzylammonium chloride | 15 | .12 |
| Totals | 12,723 | 100.03 |

Ingredients 1–3 were mixed, passed through a screen and dried. This mixture was then blended with the remaining ingredients and the resulting tabletable composition compressed into tablets as in Example I. The tablets were one inch in diameter and had an average weight of about 4.2 g. They contained 11.2 percent of the fumaric acid lubricant based on the tablet weight.

Upon being placed in water these tablets effervesced and dissolved to form an effective cleaning solution. Due to the non-toxic nature of all components, the solution was usable as a mouthwash.

The flavoring was the same as used in Examplet I.

EXAMPLE III

| Tablet components | Weight, g. | Weight, percent |
|---|---|---|
| (1) Sodium bicarbonate | 1,909 | 58.5 |
| (2) Citric acid (anhydrous) | 1,206 | 36.9 |
| (3) Coated oil particles | 100 | 3.06 |
| (4) Flavoring | 20 | .65 |
| (5) Sodium cyclohexylsulfamate | 24 | .73 |
| (6) Sodium saccharin | 2.4 | .07 |
| (7) Cetyldimethylbenzylammonium chloride | 0.5 | .02 |
| (8) Stannous fluoride | 2.0 | .06 |
| Totals | 3,263.9 | 99.99 |

The components were prepared by admixing and blending them together through No. 14 and No. 30 (U.S. Standard mesh) hand screens. The mixed material was then tableted on a single punch tableting machine. The tablets produced were adequately lubricated with scoring on the edges occurring at only the higher speeds.

The coated oil particles used in this tablet formulation were formed by spray drying an emulsion formed of 250 g. of dry gelatin, 1450 g. of gum acacia, 425 g. of corn oil, 80 g. of polydimethyl siloxane, and 3000 ml. of deionized water. The emulsion was maintained at room temperature (25° C.) and sprayed into the air stream of a spray drier which entered the drier at 265±3° C. and left at 110±5° C. Thus the particles were composed of 4 weight parts of the film-forming substances (gelatin and gum acacia) to 1 weight part of the lubricant oil.

The tablets made from the above formulation disintegrated quickly to form a mouthwash solution.

EXAMPLE IV

| Table components | Weight g. | Weight percent |
|---|---|---|
| (1) Sodium bicarbonate | 1,099 | 53.6 |
| (2) Citric acid | 1,206 | 33.9 |
| (3) Coated oil particles | 200 | 5.6 |
| (4) Flavoring | 20 | .6 |
| (5) Sodium cyclohexylsulfamate | 24 | .67 |
| (6) Sodium saccharin | 2.4 | .07 |
| (7) Cetyldimethylbenzylammonium chloride | 0.5 | .01 |
| (8) Sodium perborate | 200 | 5.6 |
| Totals | 3,561.9 | 100.05 |

The components were prepared by admixing and blending in the manner described in Example III, above. The mixture was then tableted on a single punch Colton T–12 tableting machine fitted with one inch diameter punches. The mixture flowed into the dies in the desired manner and was well lubricated for compression and subsequent ejection from the dies. When dissolved in water the tablets produced a cleaning solution which could be used to clean solid surfaces such as the surfaces of dental appliances or to aid in the control of certain diseases of the gums Component 7 acts to kill micro-organisms which are present on such surfaces while component 8 releases oxygen upon contact with water which, in turn, interferes with the metabolism of the micro-organisms and thus aids the cleaning action. When used internally the perborate also acts to denature the protein of the affected gum tissue thus toughening it and making it less susceptible to further irritation.

The coated oil particles lubricant was formed by spray drying an emulsion of the following composition: 200 g. of dry gelatin, 1000 g. of gum acacia, 200 g. of olive oil, 40 g. of polydimethyl siloxane, and 2400 g. of deionized water. This emulsion was spray dried under the conditions used for the lubricant of Example III, above. The resultant dry particles had a ratio of film-forming substance to lubricating oil of 6 to 1.

EXAMPLE V

| Tablet components | Weight, g. | Weight percent |
|---|---|---|
| (1) Sodium bicarbonate | 2,200.0 | 54.0 |
| (2) Citric acid | 1,542.0 | 37.9 |
| (3) Coated oil particles | 200.0 | 4.9 |
| (4) Flavoring | 100.0 | 2.5 |
| (5) Dye (light green) | 0.9 | .02 |
| (6) Sodium cyclohexylsulfamate | 20.0 | .49 |
| (7) Sodium saccharin | 2.0 | .05 |
| (8) Cetyldimethylbenzylammonium chloride | 10.0 | .25 |
| Totals | 4,074.9 | 100.01 |

The components were mixed and tableted according to the procedure set out in Example II, above. The tablets showed good lubrication and were, therefore run at commercial rates on a single punch machine. The tablets disintegrated quickly in room temperature water (25° C.) to produce a mouthwash solution.

The coated oil particles lubricant was formed by spray drying an emulsion of the following composition: 900 g. of the starch gum of Example I, 100 g. of the refined vegetable oil of the same example, 20 g. of a polydimethyl siloxane, and 1500 g. of deionized water. The emulsion was maintained at room temperature and sprayed into the air stream of a spray drier which entered the drier at 250±10° C. and exited at 110±5° C. The resulting particles were composed of 9 weight parts of the starch gum film former to 1 weight part of the lubricating oil.

EXAMPLE VI

| Component | Weight, g. | Weight percent |
|---|---|---|
| (1) Sodium bicarbonate | 1,056 | 32.7 |
| (2) Potassium monopersulfate | 1,056 | 32.7 |
| (3) Sodium tripolyphosphate | 528 | 16.4 |
| (4) Potassium bisulfate | 185 | 5.7 |
| (5) Spearmint flavoring | 27 | .8 |
| (6) Sodium chloride | 11 | .3 |
| (7) Dioctyl sodium sulfosuccinate [1] | 70 | 2.2 |
| (8) Fumaric acid | 300 | 9.3 |
| Totals | 3,233 | 100.1 |

[1] On sodium benzoate carrier.

The sodium bicarbonate was dried and the materials were then mixed in order of their increasing amounts. Tablets of 1.0 inch diameter and 0.20 inch thickness weighing 3.233 g. each were compressed from this mixture on a single punch, one station tableting machine. These tablets were of elegant appearance and exhibited a six minute dissolution time in 16° C. water. The fumaric acid provided adequate lubrication.

These tablets effervesced when placed in water and released into the water carbon dioxide, and the other components which are all soluble. The potassium monopersulfate functions as a bleach and releases oxygen and also reacts with the sodium chloride to release chlorine gas which aids the bleaching action. Both gases function as antimicrobial agents. The sodium tripolyphosphate and potassium bisulfate function to promote cleaning action by the solution formed as does the wetting agent dioctyl sodium sulfosuccinate. Hence, these tablets may be used to clean solid surfaces by either submerging a tablet and the surface to be cleaned in the same body of water or by dissolving the tablet in water to form a cleaning solution which can then be applied to the solid surface. These tablets are ideally suited for cleaning removable dental appliances by the first of these two cleaning methods. Other solid surfaces such as porcelain, glass, solid resin, and metal surfaces can also be cleaned by both cleaning methods using these tablets.

EXAMPLE VII

| Tablet components | Weight, g. | Weight percent |
|---|---|---|
| (1) Sodium bicarbonate | 2,200.0 | 53 |
| (2) Citric acid (anhydrous) | 1,742.0 | 42 |
| (3) Coated oil particles | 75.0 | 1.81 |
| (4) Flavoring | 100.0 | 2.4 |
| (5) Dye (light blue) | 0.9 | .02 |
| (6) Sodium cyclohexylsulfamate | 20.0 | .48 |
| (7) Sodium saccharin | 2.0 | .05 |
| (8) Cetyldimethylbenzylammonium chloride | 10.0 | .24 |
| Totals | 4,149.9 | 100.00 |

The above components were mixed in the order of their decreasing amounts, i.e., component Nos. 1, 2, 4, 3, 6, 8, 7 and 5. The dry tabletable mixture was then tableted on a single punch machine fitted with one inch diameter punches. The tablets were 0.2 inch thick and showed a hardness of about from 3 to 4 kg. They dissolved in an average time of 42 seconds at 23° C.

The coated oil particles lubricant used was of the same type as used for Example I, above, with the addition of 22 percent of polydimethyl siloxane in the lubricating oil based on the weight of the oil.

These tablets were then subjected to a stability test when stacked in threaded glass jars sealed with lined metal screw caps. For this test two of the capped bottles were separately stored for two weeks at 40° C. and at 50° C. Various properties of the tablets after this period of storage were then compared to the original properties prior to the test. The resulting data is given in Table 1, below.

The first property measured was the appearance. The notations NC and Sl.Y. have been used to designate no change and slight yellowing, respectively, and are based on the appearance of the original tablets. The hardness of the tablets were then measured on a Stokes Hardness Tester. The disintegration times in 135 ml. of 43° C. water were measured and the pH's of the resulting solutions were taken. The tablets were then analyzed for the active amount of the quaternary ammonium salt, component No. 8.

A modified phenol coefficient test using *S. aureus* was conducted by dissolving one of the tablets from each storage condition in 135 ml. of 43° C. water. The method used is described in Horwitz, W.: Official Methods of Analysis of the AOAC, 10th ed., Association of Official Agricultural Chemists, Washington, D.C. (1965), pp. 80–94. The results of this test were recorded in terms of the time required for complete bacterial kill.

TABLE 1.—TABLET STABILITY RESULTS

| Time, temperature | Appearance | Hardness, kg. | Disintegration time, sec. | pH | Quaternary, mg./ tablet | Complete kill time, minutes |
|---|---|---|---|---|---|---|
| Original, 22° C | | 6.4 | 33 | 6.4 | 9.98 | 5 |
| 2 weeks, 40° C | NC | 8.7 | 33 | 6.6 | 9.54 | 10 |
| 2 weeks, 50° C | Sl.Y. | 10.7 | 33 | 6.8 | 8.07 | 10 |

From these results it can be seen that the accelerated aging has not markedly altered these properties of the tablet and that the tablet is stable and remains effective as a mouthwash tablet.

In summary, a water-soluble effervescent tablet is provided which contains a solid state antimicrobial substance and a solid state tableting lubricant. The first of these components allows an effective cleaning solution to be formed upon disintegration in water, while the latter allows the tablet to be commercially manufactured and to form a uniform solution upon disintegration.

What is claimed is:

1. A tablet producing a clear aqueous solution and being free from insoluble tablet lubricants or other tablet excipients or components which cause a tablet formed from an otherwise soluble composition to produce a clouded suspension having undesirable surface scum rather than a uniform solution when dissolved in water consisting essentially of a compressed, essentially free-flowing mixture of a powdered, water-soluble, tabletable essential active ingredient comprising an effervescent couple and a water-soluble antimicrobial substance and, as the essential tablet lubricant, a dry-mixable tableting lubricant comprising either (a) fumaric acid or (b) lubricating oil particles coated with an oil-insoluble, water-soluble film forming substance with a siloxane polymer punch and die wall lubricant, said lubricating oil particles being selected from the group consisting of vegetable oils, animal oils, mineral oils and synthetic polyethylene glycols of 250 to 2,000 molecular weight, said oil-insoluble, water-soluble film-forming substance being selected from the group consisting of water-soluble gums, modified celluloses, proteinaceous materials, polymeric sea-plant derivatives, agar-agar and synthetic film-forming polymers.

2. A tablet according to claim 1 wherein said powdered mixture also contains a component selected from the group consisting of a coloring agent and a flavoring agent.

3. A tablet according to claim 1 wherein said antimicrobial substance is a quaternary ammonium salt.

4. A tablet according to claim 1 wherein said effervescent couple is composed of a metal carbonate salt and a polycarboxylic acid.

5. A tablet according to claim 1 wherein said tableting lubricant is present in said mixture in an amount of at least 0.5 percent by weight of said compressed mixture.

6. A tablet according to claim 1 including at least one anticaries active substance.

7. A tablet according to claim 1 wherein the anticaries active substance is selected from the group consisting of stannous fluoride and sodium monofluorophosphate.

8. A tablet according to claim 1 which further includes at least one water-soluble substance releasing an antimicrobial gas selected from the group consisting of oxygen and chlorine.

References Cited

UNITED STATES PATENTS

| | | | |
|---|---|---|---|
| 3,245,798 | 4/1966 | Van Ness | 99—78 |
| 3,330,665 | 7/1967 | Van Ness et al. | 99—78 |
| 3,330,775 | 7/1967 | Marquis | 252—363.5 |
| 3,370,956 | 2/1968 | Reitman et al. | 99—78 |
| 2,035,267 | 3/1936 | Fleischman | 424—53 |
| 2,913,373 | 11/1959 | Weisz et al. | 424—52 |
| 3,082,091 | 3/1963 | Smith et al. | 424—44 |
| 3,105,792 | 10/1963 | White | 424—44 |
| 3,136,692 | 6/1964 | Bandelin | 424—44 |
| 3,282,792 | 11/1966 | Fiscella | 424—52 |
| 3,355,392 | 11/1967 | Cantor et al. | 424—329 XR |
| 3,382,150 | 5/1968 | Grass et al. | 424—32 |

FOREIGN PATENTS

| | | |
|---|---|---|
| 6,503,367 | 9/1965 | Netherlands. |
| 6,509,856 | 1/1966 | Netherlands. |
| 6,516,003 | 6/1966 | Netherlands. |
| 1,243,597 | 6/1967 | Germany. |

SHEP K. ROSE, Primary Examiner

U.S. Cl. X.R.

424—49, 52, 53, 148, 149, 184, 263, 329; 117—100; 252—1, 9, 10, 11, 94, 99, 106, 181, 350; 264—39, 300, 338; 106—38.22; 8—79; 99—77.1, 78, 79, 140, 148